(12) United States Patent
Afshar et al.

(10) Patent No.: US 12,296,857 B2
(45) Date of Patent: May 13, 2025

(54) PATH-BASED TRAJECTORY PREDICTION

(71) Applicant: Motional AD LLC, Boston, MA (US)

(72) Inventors: Sepideh Afshar, Cambridge, MA (US);
Akshay Bhagat, Pittsburgh, PA (US);
Lu Lu, Upton, MA (US); Balarama Raju Buddharaju, Pittsburgh, PA (US);
Henggang Cui, Allison Park, PA (US)

(73) Assignee: Motional AD LLC, Boston, MA (US)

( * ) Notice: Subject to any disclaimer, the term of this patent is extended or adjusted under 35 U.S.C. 154(b) by 206 days.

(21) Appl. No.: 18/085,516

(22) Filed: Dec. 20, 2022

(65) Prior Publication Data

US 2024/0132112 A1 Apr. 25, 2024

Related U.S. Application Data

(60) Provisional application No. 63/424,814, filed on Nov. 11, 2022, provisional application No. 63/416,476, filed on Oct. 14, 2022.

(51) Int. Cl.
*B60W 60/00* (2020.01)
*G01C 21/32* (2006.01)

(52) U.S. Cl.
CPC ......... *B60W 60/0027* (2020.02); *G01C 21/32* (2013.01); *B60W 2554/4041* (2020.02);
(Continued)

(58) Field of Classification Search
CPC ..... B60W 60/0027; B60W 2554/4041; B60W 2554/4042; B60W 2554/4046; B60W 2556/10; B60W 2556/40; G01C 21/32
See application file for complete search history.

(56) References Cited

U.S. PATENT DOCUMENTS 11,885,625 B1 * 1/2024 McGavran ............. G01C 21/32
11,987,265 B1 * 5/2024 Zhao ........................ G06N 3/08
(Continued)

FOREIGN PATENT DOCUMENTS

| CN | 110415266 | 11/2019 |
|---|---|---|
| EP | 3832420 | 6/2021 |
| WO | WO 2022/035602 | 2/2022 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
(Continued)

*Primary Examiner* — Peter D Nolan
*Assistant Examiner* — Anwar Mohamed
(74) *Attorney, Agent, or Firm* — Fish & Richardson P.C.

(57) ABSTRACT

Among other things, techniques are described for path-based trajectory prediction (e.g., for autonomous driving). The technique includes: obtaining information about one or more agents in a portion of an environment where a vehicle is operating, the information including data associated with locations of the one or more agents in the portion of the environment; for each of at least one agent of the one or more agents, determining a reference path for the agent based on a location of the agent in the environment, and predicting a future trajectory of the agent based on the reference path; and operating the vehicle based on one or more predicted future trajectories of the at least one agent of the one or more agents.

19 Claims, 12 Drawing Sheets

(52) U.S. Cl.
CPC .............. *B60W 2554/4042* (2020.02); *B60W 2554/4046* (2020.02); *B60W 2556/10* (2020.02); *B60W 2556/40* (2020.02)

(56) References Cited

U.S. PATENT DOCUMENTS

| | | | |
|---|---|---|---|
| 2021/0380106 A1 | 12/2021 | Chinni | |
| 2023/0322259 A1* | 10/2023 | Sadek | B60W 60/0015 |
| | | | 701/23 |
| 2023/0406359 A1* | 12/2023 | Fasola | B60W 50/06 |
| 2024/0149906 A1* | 5/2024 | Zhao | G06Q 10/047 |
| 2024/0278803 A1* | 8/2024 | Zhao | B60W 30/10 |

OTHER PUBLICATIONS

International Search Report and Written Opinion of the International Appln. No. PCT/US2023/034475, mailed on Jan. 5, 2024, 14 pages.

* cited by examiner

PATH-BASED TRAJECTORY PREDICTION

CROSS-REFERENCE TO RELATED APPLICATION

This application claims priority under 35 USC § 119(e) to U.S. Provisional Patent Application Ser. No. 63/424,814, filed on Nov. 11, 2022, and U.S. Provisional Patent Application Ser. No. 63/416,476, filed on Oct. 14, 2022, the entire contents of which are hereby incorporated by reference.

BACKGROUND

To safely navigate through traffic while offering passengers a smooth ride, autonomous vehicles need the ability to predict the trajectories of surrounding objects or agents (e.g., nearby vehicles, bicycles, and/or pedestrians). There is inherent uncertainty in predicting the future, making this a challenging task.

DETAILED DESCRIPTION

Figure 1:
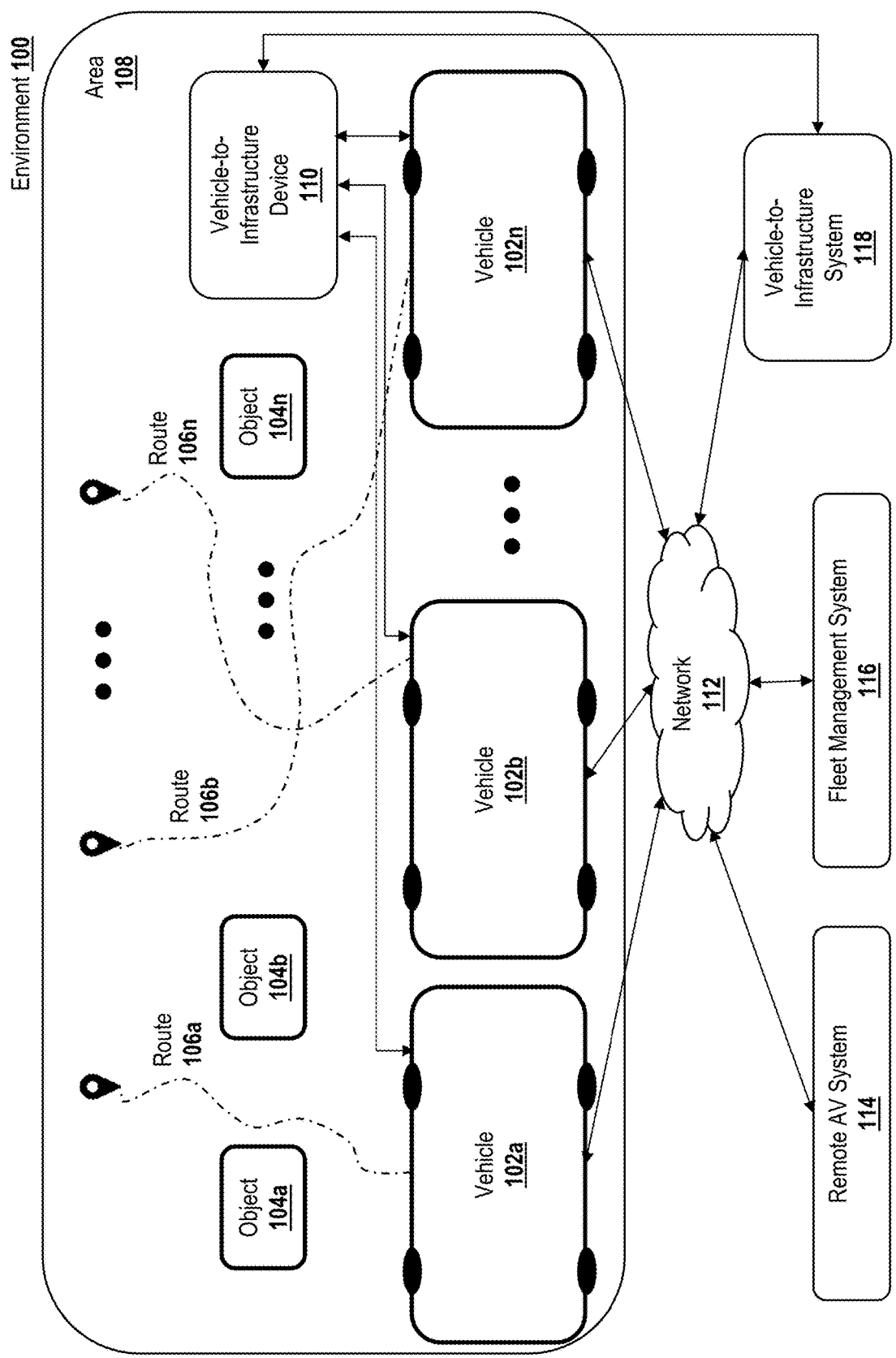
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

The terminology used in the description of the various described embodiments herein is for the purpose of describing particular embodiments only and is not intended to be limiting.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles. As used herein, an autonomous vehicle (AV) is a vehicle that possesses autonomous capability. As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller. As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

The term "over-the-air (OTA) client" includes any AV, or any electronic device (e.g., computer, controller, IoT device, electronic control unit (ECU)) that is embedded in, coupled to, or in communication with an AV. The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., Wi-Fi) and/or satellite Internet. The term "edge node" means one or more edge devices coupled to a network that provide a portal for communication with AVs and can communicate with other edge nodes and a cloud based computing platform, for scheduling and delivering OTA updates to OTA clients. The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof. As used herein, "satisfy" refers to meeting a predetermined condition or requirement, for example, no greater than a predetermined threshold, or no less than a value.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

To provide a safe and reliable drive, autonomous vehicles (AVs) need to react to their surrounding environments effectively. The techniques described herein perform path-based prediction of potential future trajectories of agents (e.g., surrounding vehicles, bicycles, and/or pedestrians) in a field of view of an AV. Particularly, the techniques predict not only future targets (e.g., intermediate destinations) of the agents but also reference paths (e.g., ones with highest probabilities) which each agent is likely to follow. After predicting a reference path, a future trajectory of each agent is completed with respect to its predicted reference path, which enhances a map compliance of the prediction. The techniques train a prediction model to perform the path-based trajectory prediction in a path relative Frenet frame (instead of a Cartesian coordinate system) to increase a likelihood of the predicted future trajectory to be in close proximity of the predicted reference path.

For each agent, the path-based trajectory prediction can include multiple operations: 1) vectorizing map into connected lane segments; 2) sampling the vectorized map for candidate reference paths (e.g., in 8 seconds) with reachable lane segments or reachable targets (e.g., end points) of the candidate reference paths; 3) classifying a set of candidate reference paths (e.g., by predicting a discrete probability distribution over the candidate reference paths) based on defined feature vectors, including scene feature vector (e.g., agent behavior) and path feature vector (e.g., first point, middle point, last point, direction, and length of each candidate reference path); 4) making trajectory prediction with respect to one or more selected reference paths in the Frenet frame using agents feature map augmented with path information; and 5) transforming the predicted trajectories back to Cartesian co-ordinates relative to the agent to obtain multimodal predictions.

Some of the advantages of these techniques are as follows. For example, the techniques predict trajectories conditioned on feature descriptors of a complete reference path from the agent's current location to the agent's goal instead of just its goal locations. This is a much more informative feature descriptor and leads to more map compliant trajectories over longer prediction horizons compared to goal based prediction. Also, the techniques use reference paths, which allow to predict trajectories in the path relative Frenet frame relative to each sampled path. Compared to the Cartesian frame with varying lane locations and curvatures, predictions in the Frenet frame can have much lower variance. This again leads to more map compliant trajectories that better generalize to novel scene layouts. Moreover, compared to using a rasterized HD map for its scene and reference path encoders, the techniques directly encode the scene and reference paths using polylines, making the encoders more efficient. The techniques can sample and classify variable length reference paths along each lane centerline, which provides trajectory prediction with more flexibility to predict different motion profiles along lanes. The techniques can improve path prediction and path compliance, e.g., using agent past trajectory history in the prediction. The techniques can enhance performance of prediction in multi-lane turns with better path classifier and scene upsampling. In addition to standard metrics for multimodal prediction, the techniques can enhance two map compliance metrics of the predicted trajectories (e.g., commonly used drivable area compliance metric and a new lane deviation metric), for example, by utilizing map prior knowledge (e.g., high likelihood drivable areas). Further, the techniques can improve interaction reasoning in path encoder and improve the map and agents interaction graph. The techniques can improve reaction of autonomous vehicles to surrounding environments (e.g., periodically or continuously) to achieve reliable and accurate prediction for their own route/trajectory or operation planning, which realizes safe and reliable driving.

System Overview

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
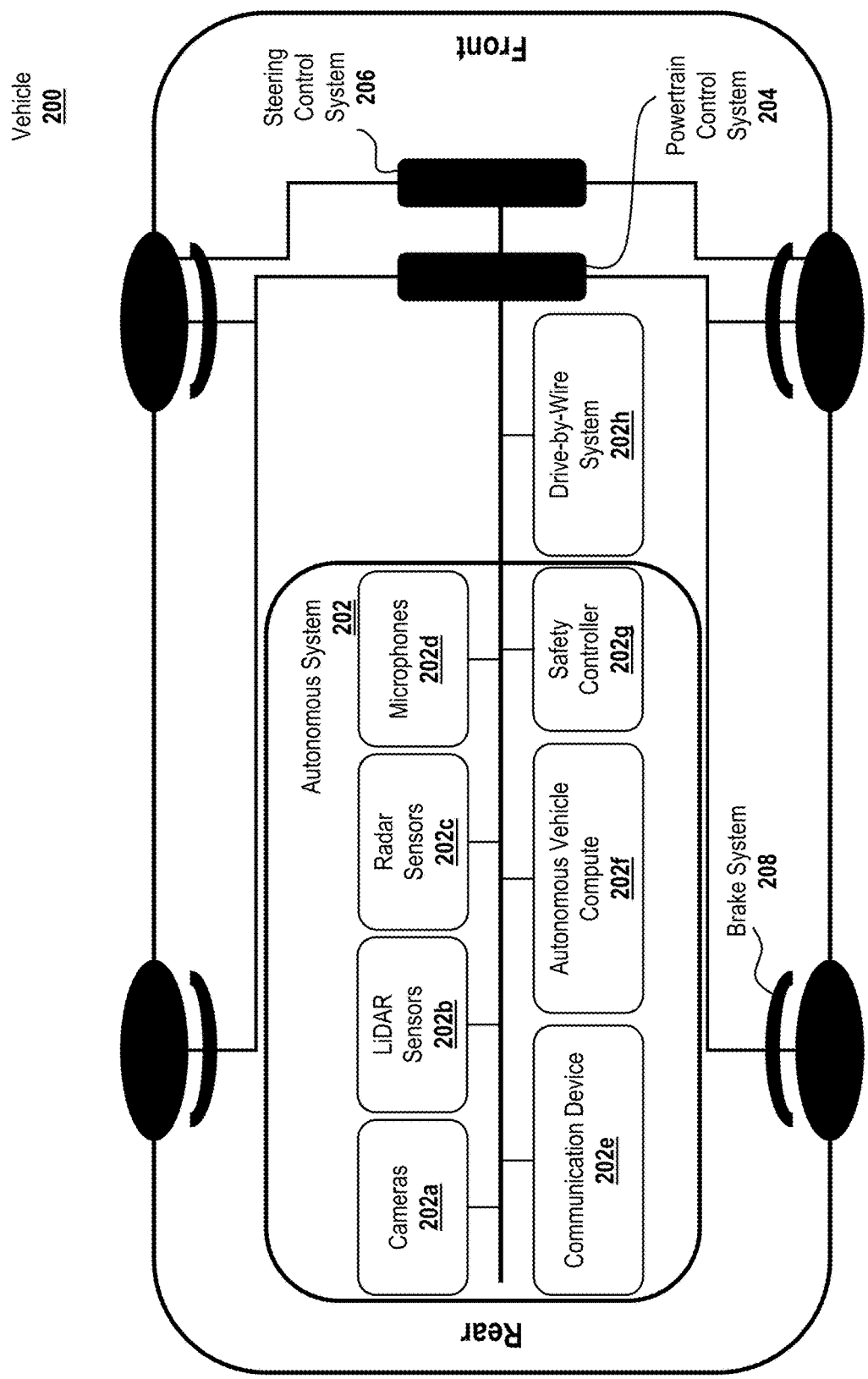
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
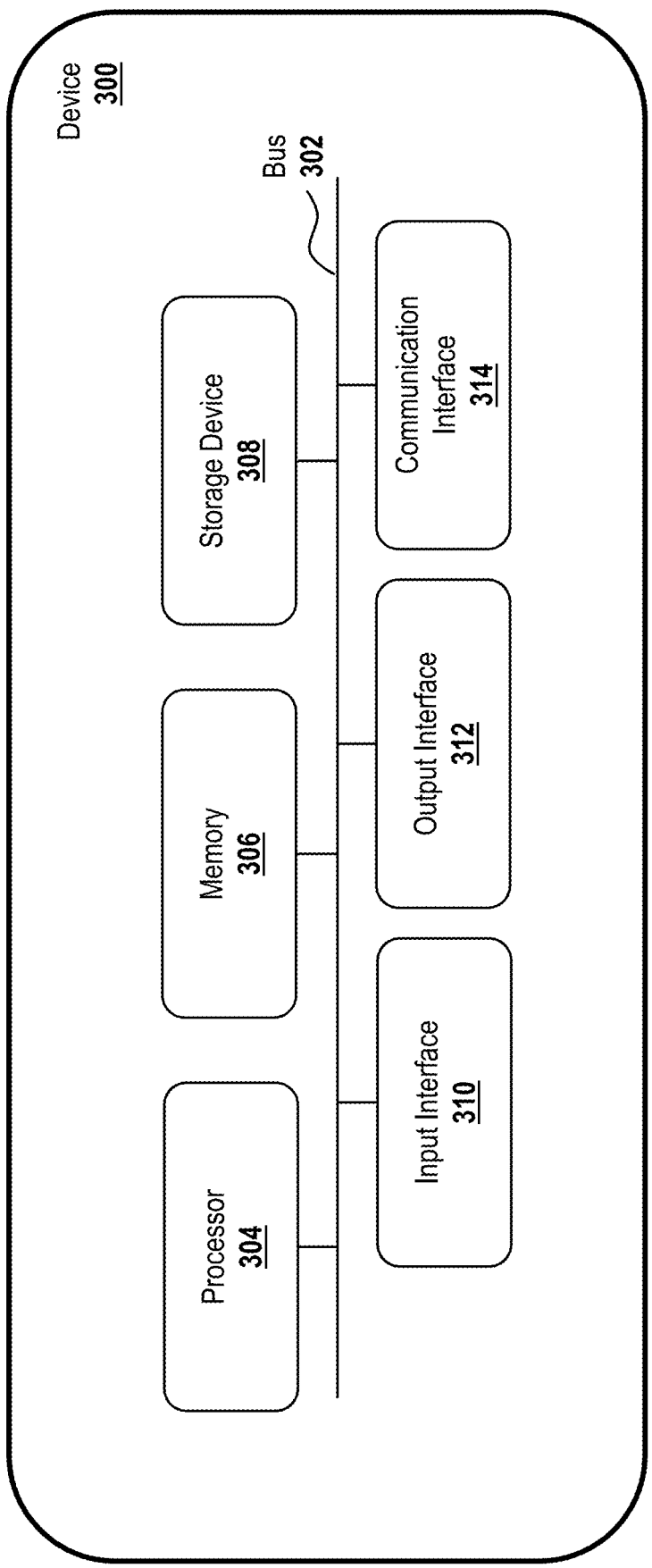
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of vehicles 102 (e.g., at least one device of a system of vehicles 102, and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
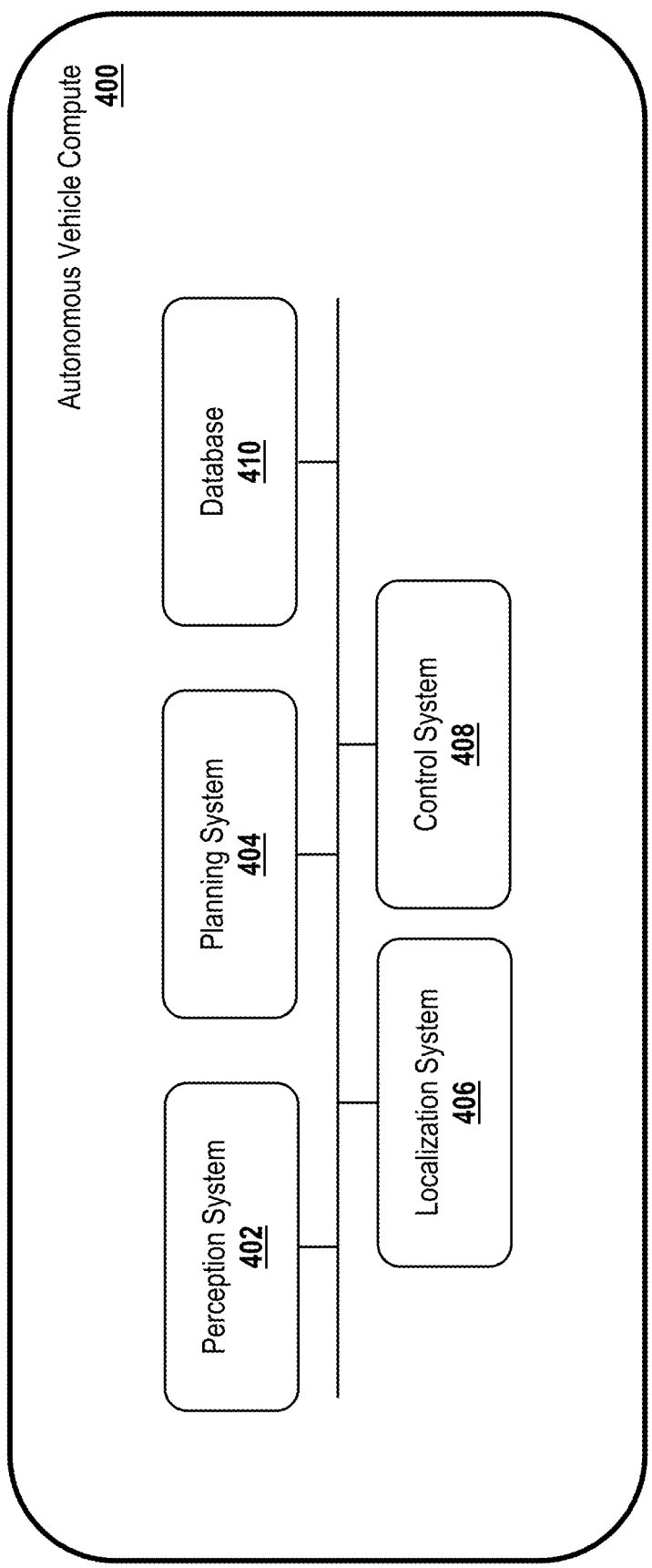
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deceleration, etc. In some embodiments, planning system 404 receives data associated with an updated position of a vehicle (e.g., vehicles 102 of FIG. 1 or vehicle 200 of FIG. 2) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102 or vehicle 200) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multi-layer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
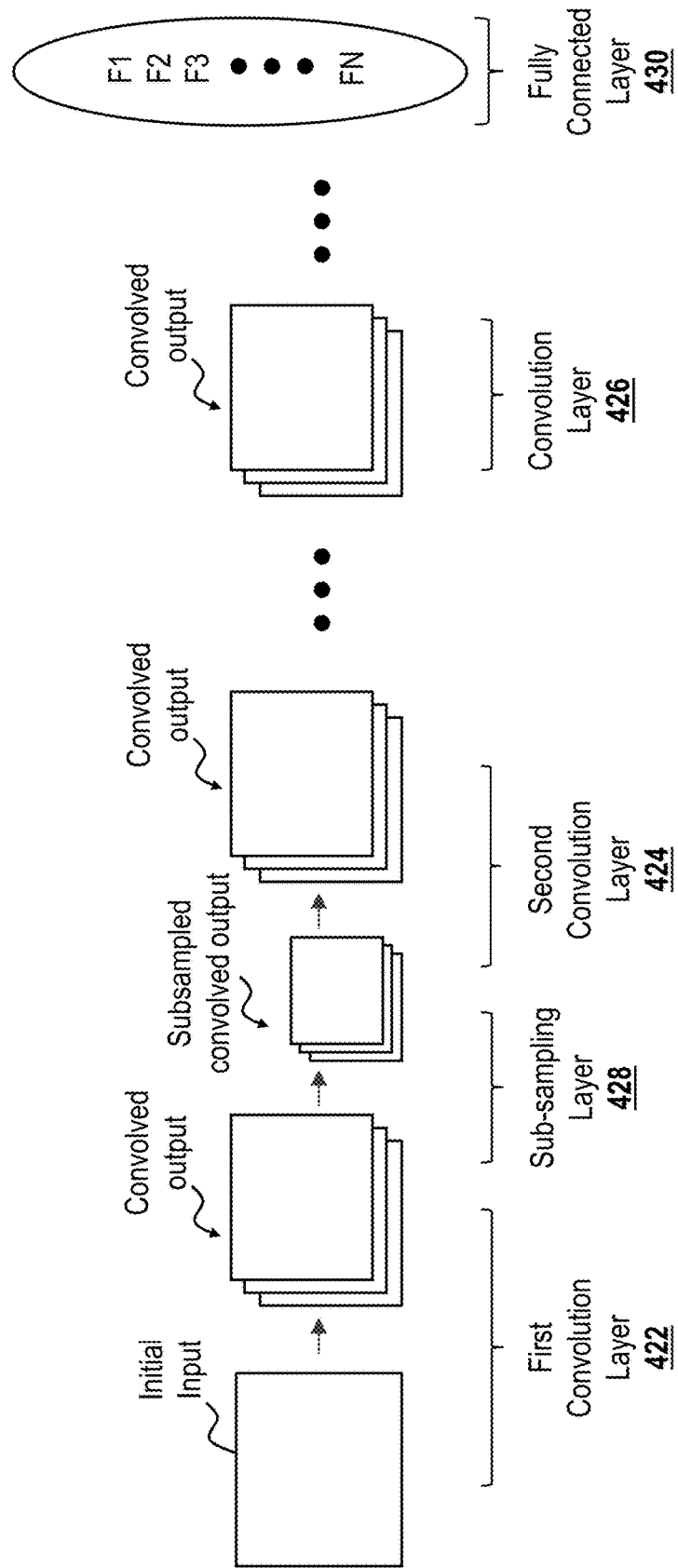
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 ... FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, ... FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on the perception system 402 providing training data associated with the prediction to CNN 420.

Figure 4C:
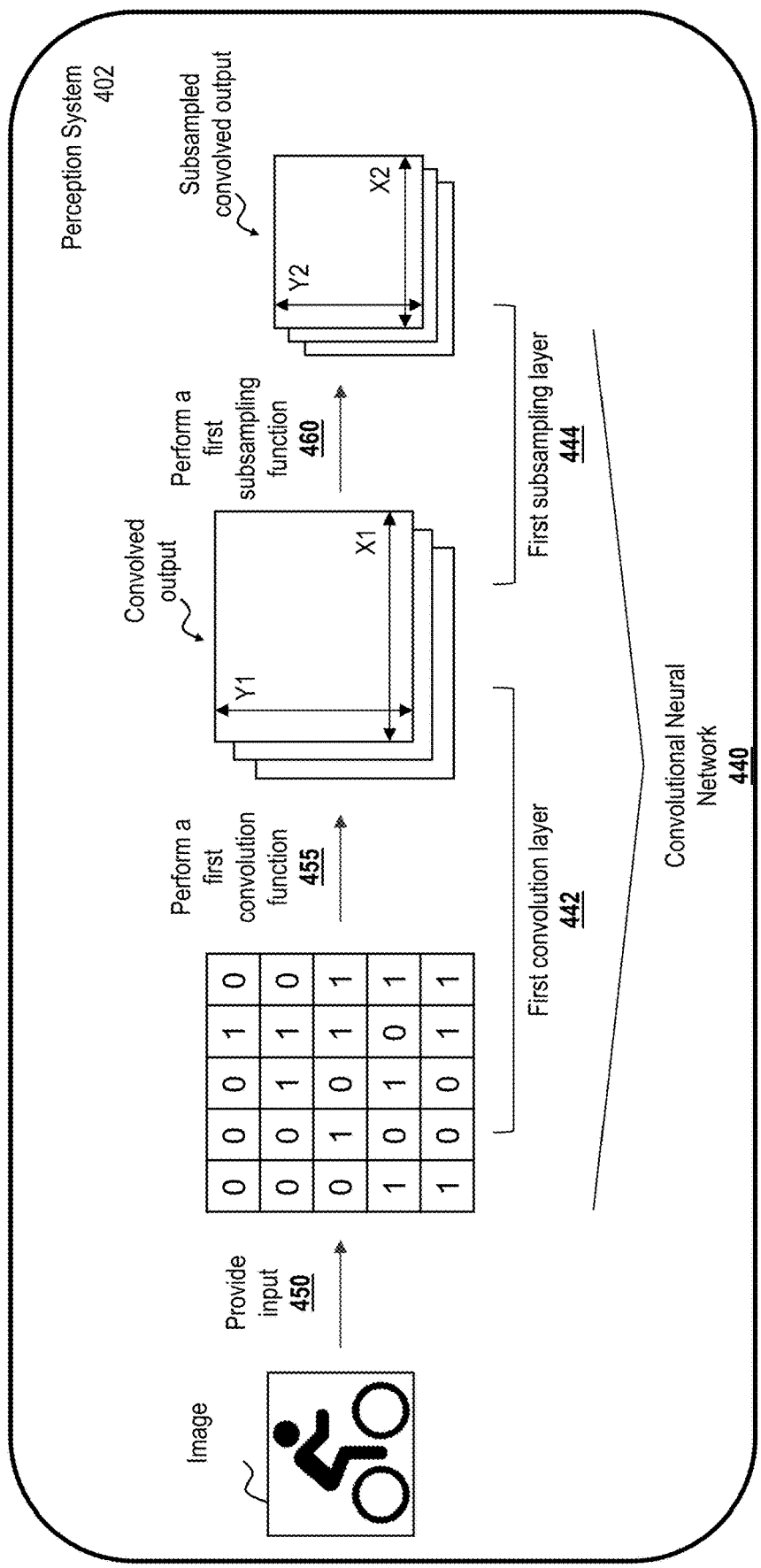
FIGS. 4C and 4D are a diagram illustrating example operation of a CNN.
Figure 4D:
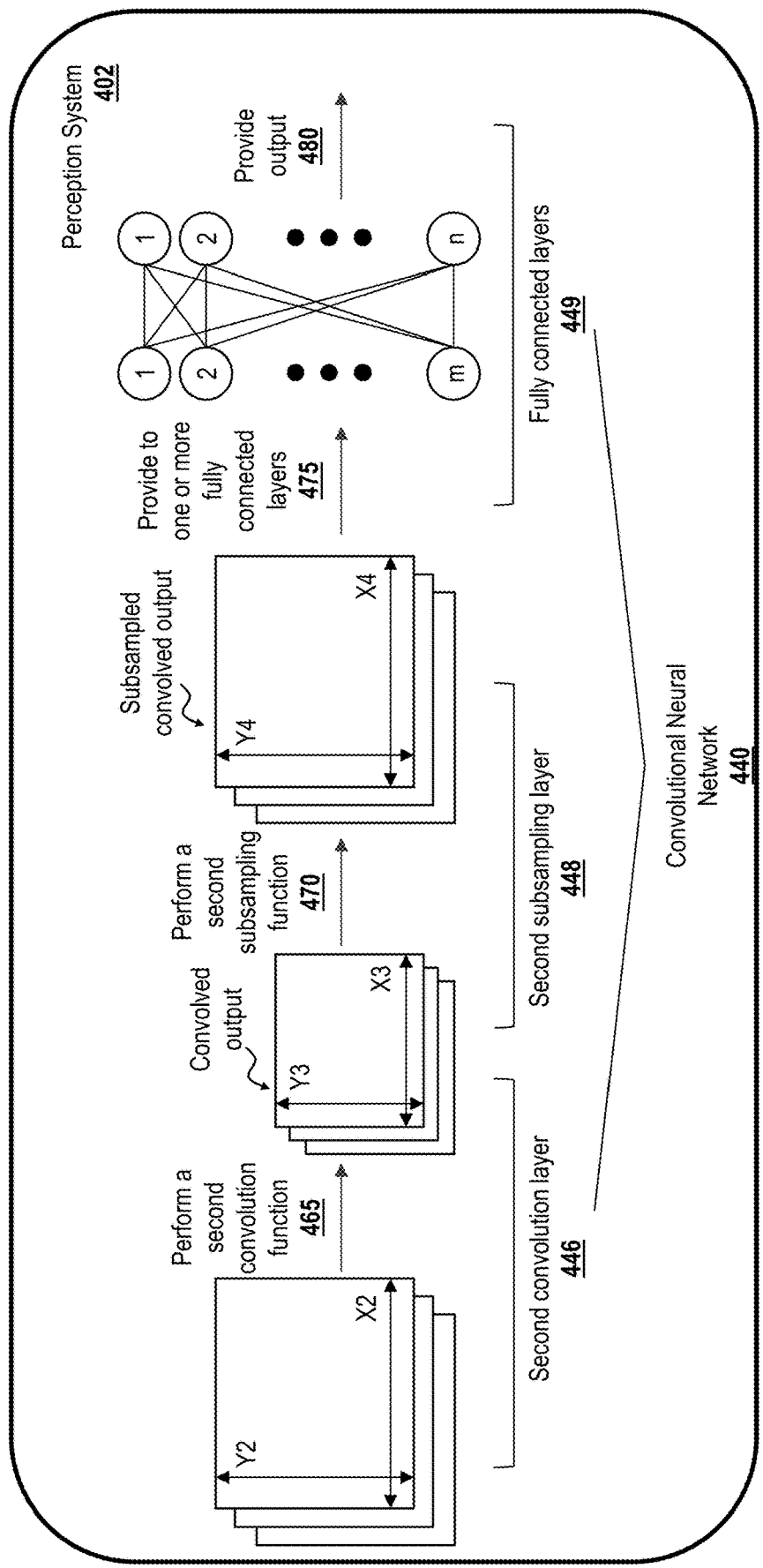

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a sub sampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second sub sampling layer 448. In some embodiments, CNN 440 adds a bias value to the aggregates of all the values provided to each neuron of the downstream layer. For example, CNN 440 adds a bias value to the aggregates of all the values provided to each neuron of second sub sampling layer 448. In such an example, CNN 440 determines a final value to provide to each neuron of second subsampling layer 448 based on the aggregates of all the values provided to each neuron and an activation function associated with each neuron of second sub sampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output 480. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Example Planning System

Figure 5:
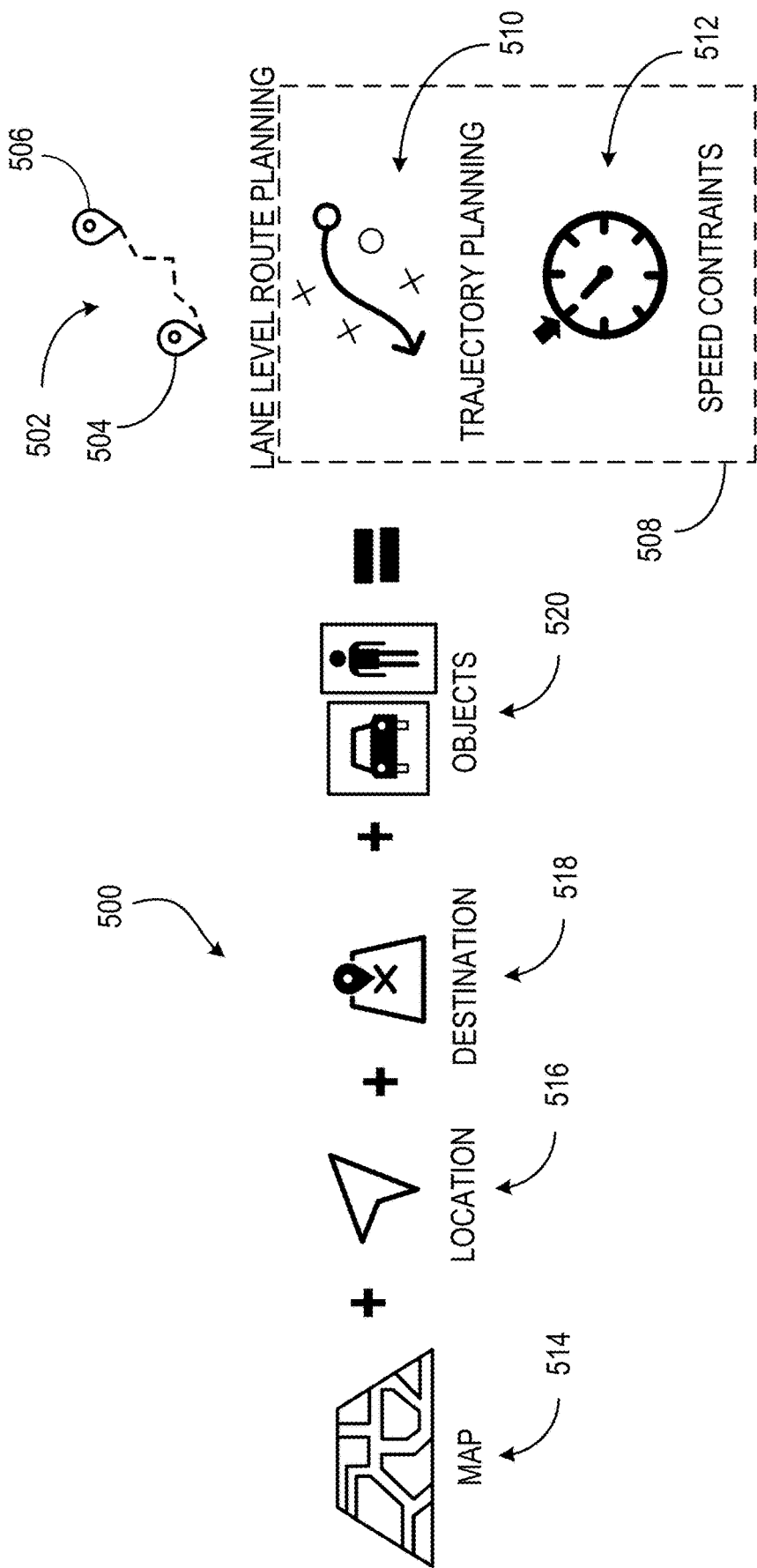
FIG. 5 shows a diagram of relationships between inputs and outputs of a planning system.

FIG. 5 shows a diagram 500 of relationships between inputs and outputs of a planning system 404 (e.g., as shown in FIG. 4A). In general, the output of a planning system 404 is a route 502 from a start point 504 (e.g., source location or initial location), and an end point 506 (e.g., destination or final location). The route 502 is typically defined by one or more segments. For example, a segment is a distance to be traveled over at least a portion of a street, road, highway, driveway, or other physical area appropriate for automobile travel. In some examples, e.g., if the vehicle 200 is an off-road capable vehicle such as a four-wheel-drive (4WD) or all-wheel-drive (AWD) car, SUV, pick-up truck, or the like, the route 502 includes "off-road" segments such as unpaved paths or open fields.

In addition to the route 502, a planning system also outputs lane-level route planning data 508. The lane-level route planning data 508 is used to traverse segments of the route 502 based on conditions of the segment at a particular time. For example, if the route 502 includes a multi-lane highway, the lane-level route planning data 508 includes trajectory planning data 510 that the vehicle 200 can use to choose a lane among the multiple lanes, e.g., based on whether an exit is approaching, whether one or more of the lanes have other vehicles, or other factors that vary over the course of a few minutes or less. For residential roads, a mail delivery vehicle may make frequent stops in the right-most lane. Similarly, in some embodiments, the lane-level route planning data 508 includes speed constraints 512 specific to a segment of the route 502. For example, if the segment includes pedestrians or un-expected traffic, the speed constraints 512 may limit the vehicle 200 to a travel speed slower than an expected speed, e.g., a speed based on speed limit data for the segment.

In an embodiment, the inputs to the planning system 404 includes database data 514 (e.g., from the database 410 shown in FIG. 4A), current location data 516, destination data 518, and object data 520 (e.g., classified objects or agents as perceived by the perception system 402 as shown in FIG. 4A). The agents (or objects) can include nearby vehicles, bicycles, and/or pedestrians. In some embodiments, the database data 514 includes rules used in planning. Rules are specified using a formal language, e.g., using Boolean logic. In any given situation encountered by the vehicle 200, at least some of the rules can apply to the situation. A rule applies to a given situation if the rule has conditions that are met based on information available to the vehicle 200, e.g., information about the surrounding environment. Rules can have priority. For example, a rule that says, "if the road is a freeway, move to the leftmost lane" can have a lower priority than "if the exit is approaching within a mile, move to the rightmost lane." As a further example, a rule that says, "if the vehicle in front of the vehicle 200 is a mail delivery vehicle, attempt a pass maneuver" can have a lower priority than "if within a no-passing zone, remain within the current lane."

Example Agents in an Environment

Figure 6:
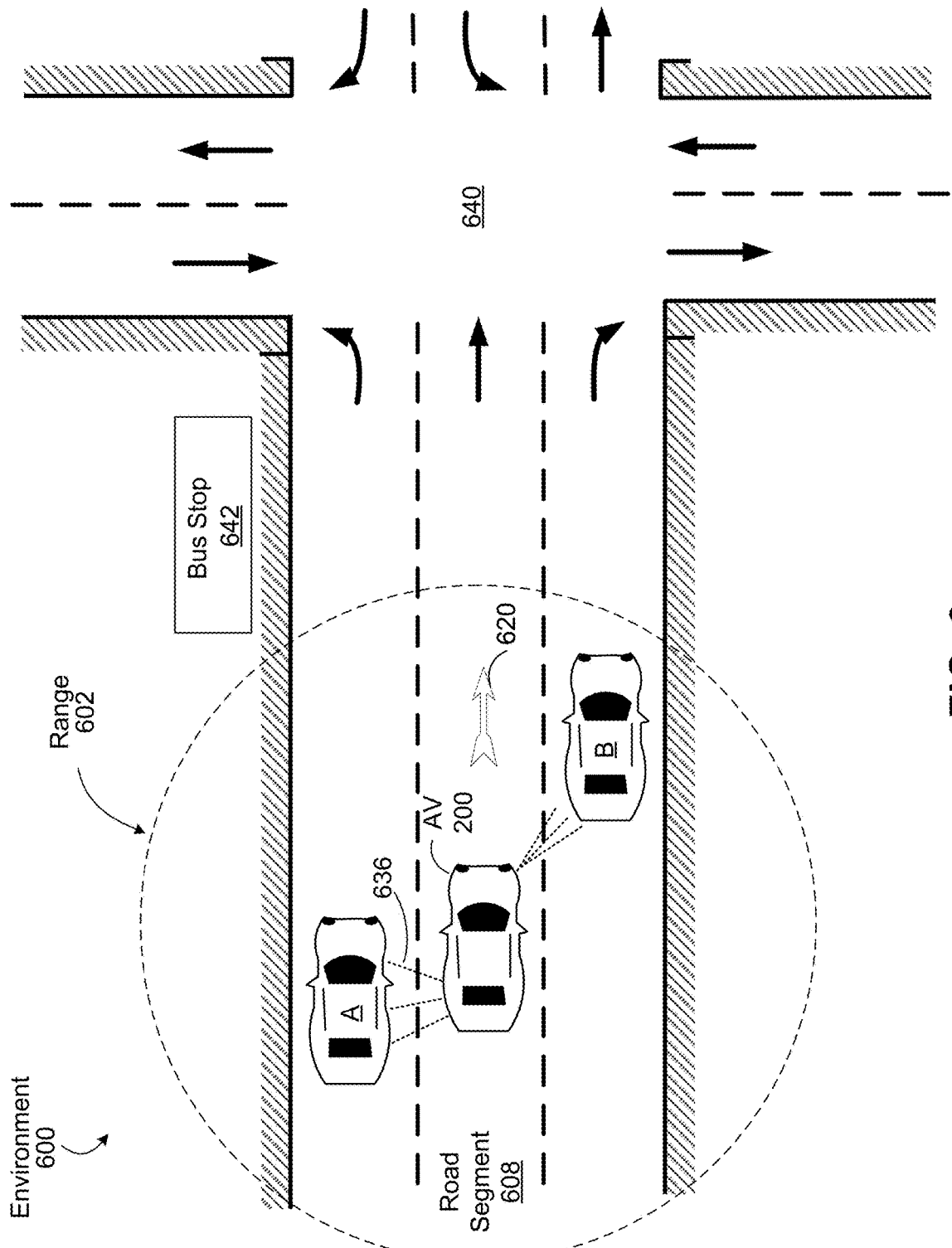
FIG. 6 shows example agents within an environment in which the vehicle is traveling.

FIG. 6 shows example agents within an environment 600 in which the vehicle 200 is traveling, e.g., along a route 620 on a road segment 608. Various moving agents (or objects) may interfere with the route 620 (or path) of the vehicle 200 during the travel of the vehicle 200. For example, another vehicle, pedestrian, or bicycle could interfere with the route 620 of the vehicle 200. As shown in FIG. 6, two agents in the environment 600, vehicle "A" and vehicle "B", are both within a range 602 of vehicle 200. The range 602 is a section or a portion of an environment 600 where the vehicle 200 "sees" (e.g., detects using one or more sensors coupled to the vehicle 200) agents that could interfere with the route 620 of the vehicle 200.

For example, vehicle "B" is 5 feet in front (front being denoted by the forward direction of travel of the vehicle 200) and in the right-most travel lane and vehicle "A" is to the immediate left of vehicle 200 and in the left-most travel lane. In some embodiments, a radius of 20 meters around vehicle 200 represents the range 602. In some embodiments, the range 602 spans an area vehicle 200 can traverse in the following 5-8 seconds. In some embodiments, the range 602 is biased in front of vehicle 200 such that there is more emphasis ahead of vehicle 200 than behind vehicle 200. In this way, the range 602 is dependent on the velocity (speed and heading) of vehicle 200.

Sensors of the vehicle 200 (e.g., sensors 202*a*-202*d*) detect the presence of both vehicle "A" and vehicle "B" (e.g., the LiDAR sensors 202*b* "sees" vehicle "A" as denoted by the ray tracing of light 636). This information is processed by the perception system 402 for agent classification. Other sensors of vehicle 200 can be used to detect the presence of vehicle "A" and "B." For example, RADAR 202*c*, cameras 202*a*, proximity sensors, and/or any sensors previously described can also be used.

However, merely knowing that vehicle "A" is to the left-hand-side of vehicle 200 is not sufficient to determine the behavior of vehicle "A." Additionally, the perception system 402 can determine a trajectory of the agent representative of the next few seconds (e.g., 5-8 seconds) of travel of the agent. The trajectory may establish that a car to the left of the vehicle 200 is travelling at 20 mph and heading straight but it is unknown if the driver is going to make an abrupt maneuver, e.g., switch lanes to take an upcoming turn. For example, if the planning system of the vehicle 200 dictates that vehicle 200 should turn left at the upcoming intersection 640, the vehicle 200 may determine that the best course of action is to slow down and move into the left-most lane behind vehicle "A." However, if it were known that vehicle "A" was a bus that was about to stop at the bus stop 642, vehicle 200 may determine the best course of action is to remain in the current lane and move into the left-most lane after vehicle "A" has slowed to a stop at the bus stop 642. Instead, if vehicle 200 had slowed down and moved behind vehicle "A" then vehicle 200 would either need to wait behind vehicle "A" at the bus stop 642 or perform a pass maneuver. Neither of these would be ideal from a time and/or passenger comfort standpoint.

As another example, if the planning system of the vehicle 200 indicates that vehicle "B" is about to proceed straight through the intersection 640, then vehicle 200 is alerted that vehicle "B" may either move into the travel lane of the vehicle 200, or perform an illegal maneuver of proceeding straight through the intersection 640 despite being in a right turn only lane. By being on alert, vehicle 200 is advised to maintain a safe distance from vehicle "B." For example, the controls system 406 could decelerate the vehicle (e.g., less throttle 420*b* and/or apply brakes 420*c*) in response to being on alert.

Trajectory prediction plays a crucial role in the autonomous driving stack by enabling autonomous vehicles such as vehicle 200 to anticipate the motion of neighboring (or surrounding) agents (e.g., vehicles or other objects that are within range 602 of the vehicle 200, such as vehicles "A" and "B"). To safely navigate through traffic while offering passengers a smooth ride, the autonomous vehicles need the ability to predict the trajectories of the neighboring agents. There is inherent uncertainty in predicting the future, making this a challenging task. Agent trajectories tend to be highly non-linear over long prediction horizons. Additionally, the distribution of future trajectories is multimodal; in a given scene an agent could have one of multiple plausible goals and could take various paths to each goal. In spite of these challenges, agent motion is not completely unconstrained. Vehicles tend to follow the direction of motion ascribed to their lanes, make legal turns and lane changes, and stop at stop signs and cross-walks. Bicyclists tend to use the bike lane, and pedestrians tend to walk along side-walks and cross-walks.

High definition (HD) maps of traffic scenes efficiently represent such constraints on agent motion, and have thus been a critical component of autonomous driving datasets. A key requisite of the trajectory prediction task for a real-world autonomous driving system is to predict map compliant trajectories—trajectories that don't go off road or violate traffic rules over long prediction horizons. For example, incorrectly predicting a non-map-compliant trajectory that encroaches into the oncoming traffic lane could cause an ego vehicle (e.g., vehicle 200) to hard brake or even make dangerous maneuvers on the road.

HD maps can be leveraged for trajectory prediction, e.g., goal-based prediction. Goal-based prediction models associate each mode of the trajectory distribution to a 2D goal location sampled from the HD map, predict a discrete distribution over the sampled goals, and then predict trajectories conditioned on each goal. This simplifies the mapping learned by the prediction header, and also makes each mode of the trajectory distribution more interpretable. However, 2D goal locations serve as a weak inductive bias to condition predictions, and may lead to imprecise trajectories to each goal, often leading to poor map-compliance, e.g., trajectories that go off-road or break traffic rules. Moreover, there could be multiple paths to each goal location and multiple modes may map to the same goal.

Path-Based Trajectory Prediction

Embodiments of the present disclosure provide techniques for path-based trajectory prediction, for example, for autonomous driving. The techniques predict a discrete probability distribution over reference paths in an HD map, and predict trajectories based on one or more selected reference paths in a path relative Frenet frame, which achieves competitive performance on standard trajectory prediction metrics, while significantly outperforming goal-free and goal-based prediction in terms of map-compliance over long horizons.

Compared to goal-based prediction, the techniques predict trajectories conditioned on feature descriptors of the entire reference path instead of just 2D goal locations. This is a much more informative feature descriptor and leads to more map compliant trajectories over longer prediction horizons compared to goal based prediction. Moreover, the reference paths allow to predict trajectories in the Frenet frame relative to each sampled path. Compared to the Cartesian frame with varying lane locations and curvatures, predictions in the Frenet frame have much lower variance. This again leads to more map compliant trajectories that better generalize to novel scene layouts.

The techniques provide a path based trajectory decoder that is modular by design and can be used with any existing scene encoder such as VectorNet, LaneGCN, Scene Transformer, Wayformer, etc. In an example, the path based trajectory decoder is built on top of HiVT encoder that achieved competitive results on the Argoverse dataset and has a publicly available code base. Trajectory prediction benchmarks commonly evaluate multimodal prediction using best of k metrics such as minADE, minFDE and missrate. This ensures that diverse but plausible modes predicted by the model are not penalized, and only the best mode is used for computing prediction errors. The techniques disclosed herein enable all predicted modes to be map compliant over long prediction horizons. In addition to the standard metrics for multimodal prediction, the path based trajectory decoder is evaluated using two map compliance metrics: the commonly used drivable area compliance metric (also called offroad rate), and a new lane deviation metric. Results show that the path-based decoder achieves competitive performance in terms of the standard minADE, minFDE and miss rate metrics, while significantly outperforming the HiVT baseline and goal based prediction in terms of map compliance metrics.

The techniques condition trajectory predictions on a complete reference path from agents' current locations to their goals in a path relative Frenet Frame, instead of in Cartesian absolute coordinate system. Also, instead of using fixed length reference paths and relying on multiple temporal modes to predict different motion profiles along each path, the techniques sample and classify variable length reference paths along each lane centerline. This provides the path-based trajectory decoder with more flexibility to predict different motion profiles along lanes. Moreover, the techniques directly encode the scene and reference paths using polylines, making the encoders more efficient.

The techniques provide a path-based trajectory forecasting model that goes beyond traditional goal-based prediction. It represents the scene in ego-centric coordinate frame and makes predictions for all agents in the scene. To achieve accurate and map-compliant predictions, it has a novel path classification design and decode trajectories in the path relative Frenet frame conditioned on the path.

An objective of the model is to forecast the future trajectories of a set of agents in the scene, given their past history positions and map context. The past history positions of an agent $a$ can be denoted by $\{P^a\}_{Past} = \{P_{-T'+1}{}^a, P_{-T'+2}{}^a, \ldots, P_0{}^a\}$, where $P_t{}^a = (x_t{}^a, y_t{}^a)$ is a 2D coordinate position, and T'>0 is the past history length. The map context M is represented as a set of discretized lane segments $\{l_j\}_{j=1}^{L}$ and their connections. The prediction model forecasts the future state of each agent $\{P^a\}_{Future} = \{P_1{}^a, P_2{}^a, \ldots, P_T{}^a\}$ over the time horizon T>0. To capture the uncertainties of the agents' future behaviors, the model outputs K trajectory predictions and their probabilities $\{p_k\}_{k=1}^{K}$ for each agent.

Figure 7:
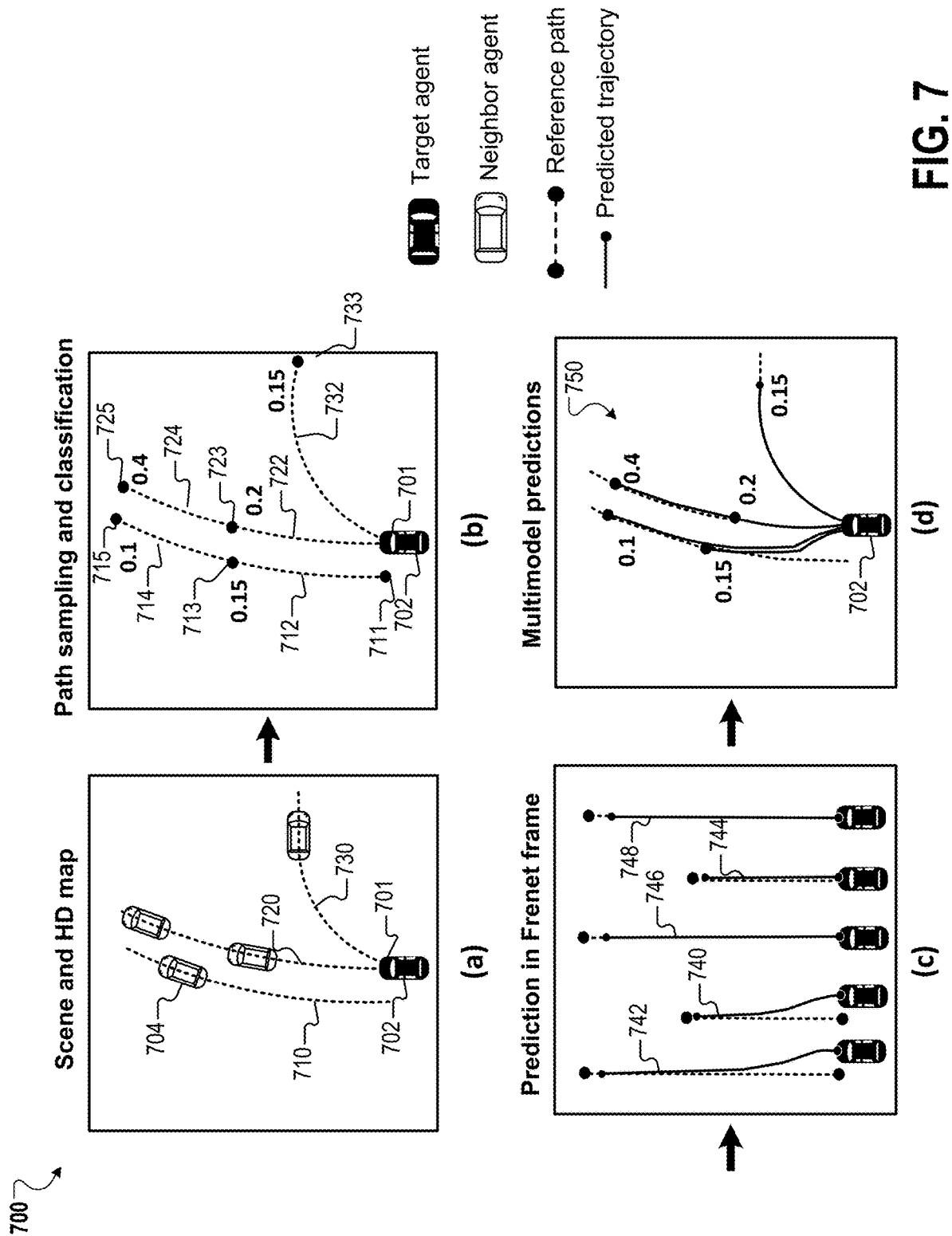
FIG. 7 illustrates a process for predicting trajectories conditioned on reference paths for a target agent.

FIG. 7 illustrates a process 700 for predicting trajectories conditioned on reference paths for a target agent 702. The target agent 702 can be the same as, or similar to, vehicle A or vehicle B in FIG. 6. The process 700 can be performed by a perception system, e.g., the perception system 402 (shown in FIG. 4A) of vehicle 200.

First, as illustrated in diagram (a) of FIG. 7, a lane network from HD maps (e.g., from the database 410 shown in FIG. 4A) is obtained. The lane network includes a plurality of lanes 710, 720, 730 (represented by lane centerlines) from a current location 701 of the target agent 702 in the HD maps. Each lane 710, 720, 730 includes one or more connected lane segments extending along the lanes. Neighboring agents 704 may be on the lanes 710, 720, 730.

Second, as illustrated in diagram (b) of FIG. 7, a plurality of reference paths 712, 714, 722, 724, 732 are sampled for the target agent 702 using the lane network. Each sampled reference path includes a starting point, an end point, and one or more connected lane segments. The starting point is in a vicinity of a current location 701 (e.g., 701 and 711) of the target agent 702. For example, reference path 712 includes one or more connected lane segments from starting point 711 to end point 713, and reference path 714 extends further from the reference path 712 and thus starts from the same starting point 711 through end point 713 to end point 715. Similarly, reference path 722 includes one or more connected lane segments from starting point 701 to end point 723, and reference path 724 extends further from the reference path 722 and thus starts from the same starting point 701 through end point 723 to end point 725. Reference path 732 includes one or more connected lane segments from starting point 701 to end point 733. A discrete probability distribution is predicted over the sampled reference paths. Each sampled reference path (e.g., 712, 714, 722, 724, and 732) has a respective probability (e.g., 0.15, 0.1, 0.2, 0.4, and 0.15) of the target agent travelling along the sampled reference path. A sum of the probabilities of the sampled reference paths is 1.

Third, as illustrated in diagram (c) of FIG. 7, future trajectories 740, 742, 744, 746, 748 of the target agent 702 are predicted (e.g., separately) based on corresponding sampled reference paths 712, 714, 722, 724, 732 in a path relative Frenet frame. The future trajectories 740, 742, 744, 746, 748 have a same starting point, the current location 701 of the target agent 702. In some cases, some of the sampled reference paths (e.g., 712, 714) have a different starting point (e.g., 711) from the starting point of the corresponding future trajectories 740, 742. In some embodiments, a reference path with the highest probability (e.g., the reference path 724 with a probability of 0.4) among the sampled reference paths is selected and a future trajectory is predicted based on the selected reference path. In some embodiments, some or all sampled reference paths are selected for predicting future trajectories of the target agent 702, such that the vehicle can obtain more information about future trajectories of the target agent 702 for better planning its own trajectory or action. The sampled reference paths are previously obtained in the Cartesian coordinate system, and are transformed to the path relative Frenet frame before predicting the future trajectories.

Fourth, as illustrated in diagram (d) of FIG. 7, the predicted future trajectories are transformed back to the Cartesian coordinate system relative to the target agent to obtain multimodal predictions 750. In some embodiments, each predicted future trajectory (e.g., 740, 742, 744, 746, 748) in the multimodal predictions 750 is assigned or scored with a respective probability (e.g., 0.15, 0.1, 0.2, 0.4, and 0.15) of its corresponding sampled reference path (e.g., 712, 714, 722, 724, and 732), to indicate the probability of the target agent 702 travelling along the predicted future trajectory.

Figure 8:
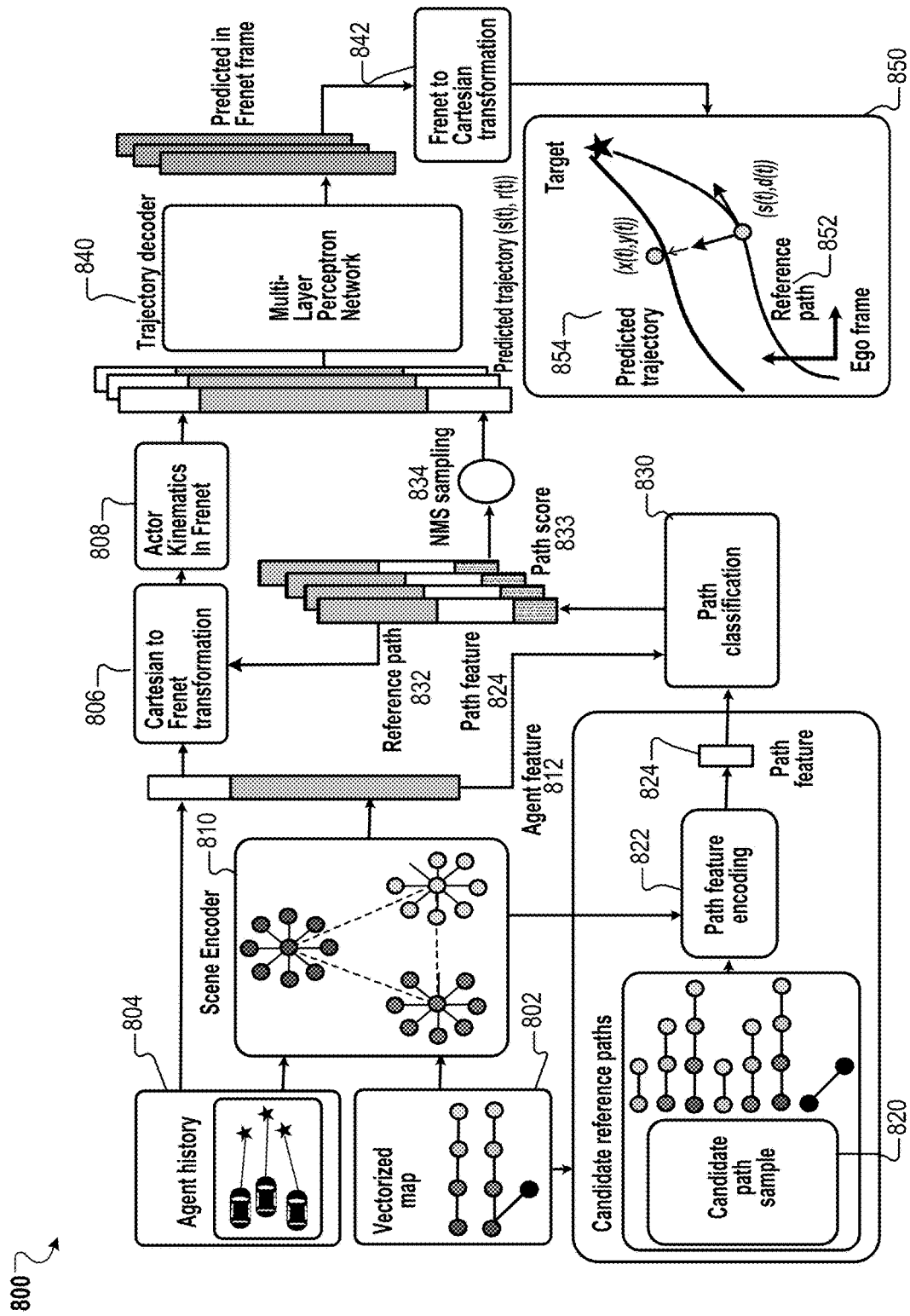
FIG. 8 is a diagram of an architecture for implementing path-based trajectory prediction for autonomous driving.

FIG. 8 is a diagram of an architecture 800 for implementing path-based trajectory prediction for autonomous driving. The architecture 800 can be implemented in the perception system 402 (shown in FIG. 4A) of vehicle 200.

As shown in FIG. 8, the architecture 800 includes four main components (or modules): scene encoder 810, candidate path sampler 820, path classifier 830, and trajectory decoder 840. As discussed with further details below, the scene encoder 810 generates agent and map embeddings from agent-map and agent-agent interactions, the candidate path sampler 820 samples the candidate paths from the map for each agent, the path classifier 830 predicts the probability of each sampled path, and the trajectory decoder 840 decodes trajectories conditioned on the selected paths.

I. Scene Encoding

The scene encoder 810 creates agent feature vectors from the scene for each agent. The agent feature vectors include information about the map (e.g., lanes, cross sections, stop signs, turns, and/or the like), agent history 804 (e.g., past trajectories of agents), as well as agent-map interactions (e.g., location data, traffic data, expected routes, and/or the like) and agent-agent interactions (e.g., neighboring agent's routes, velocity data, and/or the like). The scene encoder 810 can be obtained from the HiVT model. The scene encoder 810 represents each scene as a vectorized map 802 including a set of vectorized entities (e.g., lanes 710, 720, and 730 of FIG. 7). The agent history 804 includes one or more past (or previous) trajectories of each agent, e.g., as illustrated in FIG. 8.

In some embodiments, the scene encoder 810 uses this representation to encode the scene by hierarchical aggregation of the spatial-temporal information. First, rotational invariant local feature vectors are encoded for each agent with a transformer module to aggregate neighboring agents' information (e.g., location data, expected routes, and/or the like) as well as local map structure (e.g., lanes, cross sections, stop signs, turns, and/or the like). Next, global interactions between agents are aggregated into each agent's feature vector to capture the scene-level context. Outputs of the scene encoder 810 are feature vectors for each agent denoted by agent feature vector $F_a$ 812.

In some embodiments, the agent feature vector $F_a$ 812 includes information corresponding to agent information and map feature information. The agent information includes an agent behavior of each agent. The agent behavior includes at least one of a current position, a velocity, an acceleration, an angular velocity, or one or more past trajectories. The map feature information includes lane segment information of multiple lane segments associated with the environment of the vehicle and/or traffic information associated with the multiple lane segments. The lane segment information includes position, length, geometry, connection, direction, and/or the like. The lane segment information can be extracted via a graphical network model, e.g., LaneGNC.

In some embodiments, the scene encoder 810 determines the agent feature vector $F_a$ 812 by fusing the agent information and the map feature information, e.g., using a convolutional neural network model such as FusionNet model, to simulate and predict interactions between agents and lane segments, interactions between agents, and/or interactions between lane segments.

II. Candidate Path Sampling

An objective of the candidate path sampler 820 is to create a set of candidate reference paths for each agent by traversing the lane graph (e.g., the vectorized map 802). A reference path is defined as a sequence of connected lane segments $r_i = \{l_{i,1}, l_{i,2}, \ldots, l_{i,R_i}\}$. The starting point of the reference path for an agent a is supposed to be in the vicinity of the agent's current location $P_0^a$, and the endpoint is supposed to be in the vicinity of the agent's future trajectory endpoint $P_T^a$, e.g., as illustrated in FIG. 7.

In some embodiments, to select the candidate reference path for an agent a, a set of seed lane segments to be considered as the path starting points are selected. A simple heuristic is used to select the seed lane segments by picking the lane segments that are within a distance range (with 5 meters as the distance threshold) of the agent's current location and have their lane directions within a range of the agent's current heading (e.g., with 90 degrees as the angle threshold).

From the seed lane segments, a breadth-first search is performed to find the candidate paths, as is summarized in Algorithm 1. The output of the candidate path sampler 820 is a set of candidate reference paths for each agent, denoted as $R^a = \{r_i^a\}$. Note that in the path sampling algorithm, there is a parameter limiting the maximum number of candidates. The choice of this parameter depends on the prediction horizon and lane segment resolution.

In an example, Algorithm 1 for candidate path sampling is expresses as:

```
Input: Agent state
Input: Seed lane segments
Input: Lane graph
Initialize paths as an empty dictionary
Sort the seeds in ascending order to agent location
Initialize queue with sorted seed lanes
while queue is not empty do
    Pop node from queue
    if node not in paths then
        Initialize path with the node lane segment
        paths[node] ← path
    end if
    for each successor of node do
        if successor not in paths then
            Copy path from paths[node]
            Extend path with the successor lane segment
            paths[successor] ← path
            Push successor into queue
        end if
    end for
    if paths exceeds a maximum number of candidates then
        Break out from the while loop
    end if
end while
Output: Candidate paths in the paths dictionary
```

In some embodiments, the sampled candidate paths are determined based on sampling the plurality of lane segments to determine one or more lane segments that can be reached by the vehicle in a time period (e.g., 8 second in future).

The sampled candidate paths can be encoded with information from the scene encoder 810, e.g., by path feature encoding 822, to generate path feature $F_p$ 824 that is provided to the path classifier 830 for path classification. In some embodiments, the path feature $F_p$ 824 includes geometric information of the sampled candidate paths, e.g., a starting point, a middle point, an end point, a direction, a length of each sampled candidate path, and/or the like.

III. Path Classification

Given the set of candidate reference paths, the path classifier 830 predicts the probability distribution over the candidate reference paths using the agent feature vector $F_a$ 812 and the path features $F_p$ 824. To encode the path features $F_{p,i}$ of each path $r_i = \{l_{i,1}, l_{i,2}, \ldots, l_{i,R_i}\}$, three lane segments in the path, e.g., the start segment $l_{i,1}$, the middle segment $l_{i,R_i/2}$, and the end segment $l_{i,R_i}$ are picked. The segment middle points as well as the direction vectors (from the start to the end of the segment) of those three segments, as well as length of the path in meters, can be used as the raw features of the path. For scene encoder 810 that outputs not only agent features but also lane segment features (e.g., position, length, geometry, connection, direction, and/or the like), one can also generate the path feature vector by aggregating the lane segment features. Then those raw features can be encoded with a multi-layer perceptron (MLP) network to the path feature vector $F_p$. Sampling three segments from each path makes the path be of a fixed length so that its features can be encoded with simple MLP layers. One can also use recurrent or transformer modules to directly generate embeddings from the raw variable-sized.

To improve the accuracy of path classification, another feature vector $F_{dist,i}^a$ representing the distance between the agent a and path i can be used. For example, the distance vectors from the agent's current location to the start, middle, and end of the path are used as the raw features, and an MLP network is used to encode the path distance feature vector $F_{dist,i}^a$.

Next, given the agent feature vector $F_a$, path feature vector $F_{p,i}$, and distance feature vector $F_{dist,i}^a$, the path classifier 830 predicts the probability density function (PDF) over the set of candidate paths $R^a$ with a 2-layer MLP $f(\cdot)$ and softmax:

$$p_i^a = \frac{\exp(f(F_a, F_{p,i}, F_{dist,i}^a))}{\sum_k \exp(f(F_a, F_{p,k}, F_{dist,k}^a))}$$

Each reference path 832 has a corresponding probability as its path score 833, e.g., as illustrated in diagram (b) of FIG. 7. For each agent a, its ground-truth reference path $r_{GT}^a$ is based on its ground-truth future trajectory $\{P^a\}_{Future}$, similar to the ground-truth goal selection in goal-based prediction approaches. In an example, the reference path i whose last lane segment $r_{i,R_i}^a$ is closest to the agent's final ground-truth waypoint $P_T^a$. In another example, an agent does not have a full observed future ground-truth trajectory for the whole prediction horizon T, where $P_T^a$ can be obtained by extrapolating its future ground-truth trajectory.

Given the predicted PDF and the ground-truth reference path $r_{GT}^a$, the path classification loss is computed as a cross-entropy function:

$$\mathcal{L}_{cls}^a = -\sum_{i=1}^{R_i} 1_{i=index(r_{GT}^a)} \log p_i^a$$

Note that one key difference between the path classification and goal classification in the traditional goal-based prediction models is that the path classifier 830 uses features from not only the final goal endpoint but also the whole path. Using the path features yields a lot better performance than just using the goal endpoint features. That is because the paths have richer information than the goal endpoints. For example, goals that are seemingly reasonable in the Cartesian space might be hard to reach or even unreachable in the lane graph.

At inference time, the non maximum impression (NMS) sampling technique 834 is applied to sample a set of K diverse paths to decode trajectories with. For NMS, the distance between two paths is defined as the L2 distance between their end lane segments. For each reference path, reference path sample points obtained by NMS sampling, together with a starting point of the agent (e.g., the current position of the agent) and a target (e.g., an ending point of the reference path), can be provided to a path relative Frenet frame for trajectory prediction,

IV. Frenet Frame Trajectory Decoding

The trajectory decoder 840 decodes trajectories conditioned on the reference paths that are selected by the path classifier 830. One key difference between the trajectory decoder 840 compared to the trajectory decoder in traditional goal-based prediction models is that the trajectory decoder 840 has the information of the whole reference path instead of just the final goal endpoint (or target). To leverage this path information, the trajectory decoder 840 is configured to decode trajectories in the path relative Frenet frame, which can significantly improve the map compliance of the trajectory predictions. For example, agent position and velocity derived from the agent history 804 can be transformed, e.g., by Cartesian to Frenet transform action 806, into actor kinematics 808 in the path relative Frenet frame.

In an example, the trajectory decoder 840 includes a multi-layer perceptron (MLP) network. The MLP network can be implemented by a machine learning network model (or a machine learning prediction model), e.g., CNN 420 or 440 of FIGS. 4B-4D. For each selected reference path $r_i^a$, the trajectory decoder 840 predicts a trajectory 854 in the path relative Frenet frame, with longitudinal component $\{\hat{s}_t^a\}_{t=1\ldots T}$ and lateral component $\{\hat{d}_t^a\}_{t=1\ldots T}$. The prediction inputs include the agent feature vector $F_a$, path feature vector $F_{p,i}$, and agent history in Frenet frame $P_{Past,r_i^a}$. In an example, the trajectory decoder 840 predicts the following conditional distribution:

$$p(\{P_{Future,i,r_i^a}\}|P_{Past,r_i^a},F_a,r_i^a,F_{p,i}).$$

The trajectory decoder 840 generates, based on the conditional distribution, a precited trajectory (e.g., 740, 742, 744, 746, or 748 of FIG. 7) as an output of the machine learning network model (or the machine learning prediction model).

During the training, a teacher forcing technique is applied and the trajectory is decoded conditioned on the ground-truth reference path $r_{GT}^a$. To compute the loss, the ground-truth trajectory $P_{Future}^a$ is also transformed to the Frenet frame, with longitudinal component $\{s_t^a\}_{t=1\ldots T}$ and lateral component $\{d_t^a\}_{t=1\ldots T}$. The loss function is defined as smooth L1 losses of the longitudinal and lateral components in the Frenet frame:

$$\mathcal{L}_{reg}^a = \sum_{t=1}^T \mathcal{L}_{L1}(s_t^a, \hat{s}_t^a) + \lambda_{lateral}\mathcal{L}_{L1}(d_t^a, \hat{d}_t^a)$$

The total loss is a weighted sum of the path classification loss and the trajectory regression loss over all agents in the scene:

$$\mathcal{L} = \sum_{a \in Agents} \lambda_{cls}\mathcal{L}_{cls}^a + \mathcal{L}_{reg}^a$$

After predicting the trajectories in Frenet frame, through Frenet to Cartesian trans formation 842, the predicted trajectory 854 are transformed back to the Cartesian frame 850 using the corresponding reference path 852. In some embodiments, multiple reference paths associated with an agent are provided for trajectory prediction in the Frenet frame, and multimodal predictions can be obtained by transforming the predicted trajectories in the Frenet frame to the Cartesian frame 850, e.g., as illustrated in diagram (d) of FIG. 7.

Figure 9:
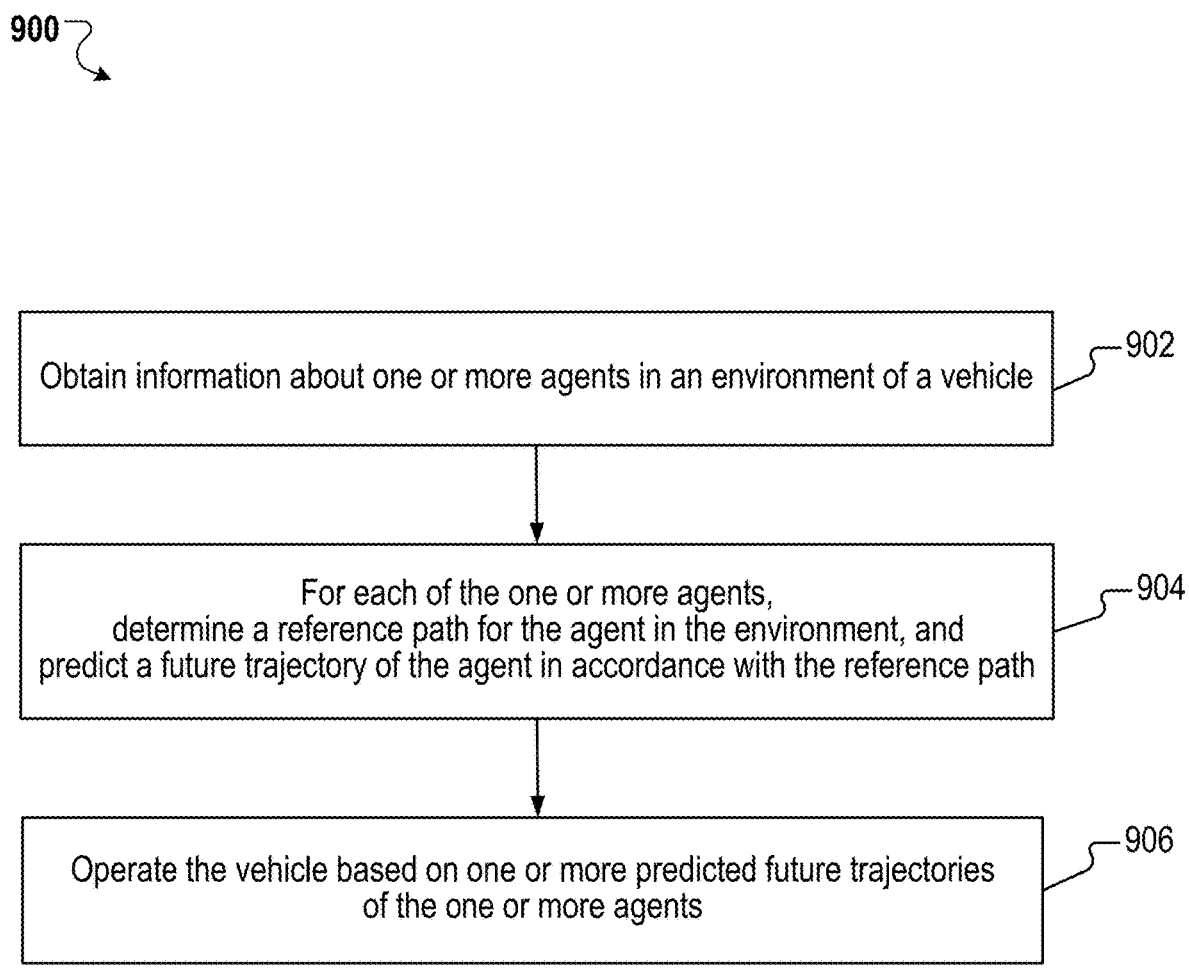
FIG. 9 is a flowchart of a process for managing path-based trajectory prediction for autonomous driving.

FIG. 9 is a flowchart of a process 900 for managing path-based trajectory prediction for autonomous driving. The process 900 can be performed by at least one processor, e.g., in the perception system 402 (shown in FIG. 4A) of the vehicle 200.

In the process 900, at 902, information about one or more agents (e.g., neighboring vehicles such as vehicle A, B in FIG. 6 or agent 702 of FIG. 7) in a portion of an environment (e.g., the environment 600 of FIG. 6) where a vehicle (e.g., the vehicle 200) is operating is obtained. In some embodiments, the portion of an environment refers to a whole environment of the vehicle. The information includes data associated with locations of the one or more agents in the portion of the environment. The information can also include agent history (e.g., past trajectory history) of the one or more agents. At 904, for each agent of the one or more agents, a reference path (e.g., 724 of FIG. 7) of the agent based on a location of the agent in the environment is determined, and a future trajectory (e.g., 746 of FIG. 7) the agent based on the reference path is predicted. At 906, the vehicle is operated based on one or more predicted future trajectories of the one or more agents (e.g., planning its own future trajectory by a planning system such as 404 of FIG. 4A).

In some embodiments, determining the reference path for the agent in the environment includes: determining one or more candidate reference paths (e.g., 712, 714, 722, 724, 732 of FIG. 7) for the agent in the environment based on at least one of the position of the agent or kinematic history of the agent, and selecting the reference path from the one or more candidate reference paths for the agent based on information of the one or more candidate reference paths (e.g., by path score 833 such as probability). The kinematic history of the agent includes a location history, a velocity history, an acceleration history, an angular velocity history, or one or more past trajectories of the agent.

In some embodiments, determining the one or more candidate reference paths for the agent in the environment includes: obtaining map information (e.g., the vectorized map 802 of FIG. 8) based on the location of the agent in the environment (e.g., by vectorizing a map of a region near the agent). The map information includes data associated with a plurality of lane segments for the location of the agent in the environment and connection data of the plurality of lane segments. In one example, the connection data of the plurality of lane segments include data associated with connections for each lane segment of the plurality of lane segments. The one or more candidate reference paths are determined based on the map information, e.g., by candidate path sampling using candidate path sampler 820 of FIG. 8.

For example, each of the one or more candidate reference paths includes a sequence of connected lane segments. Determining the one or more candidate reference paths based on the map information includes: selecting one or more seed lane segments as one or more starting points for the agent that are based on the location of the agent (e.g., by picking the lane segments within a distance range of the agent's location and have their lane directions within a range of the agent's current heading); searching, from the one or more seed lane segments, one or more reachable lane segments associated with a time period in future (e.g., 5~8 s) based on the connection data of the plurality of lane segments; and generating the one or more candidate reference paths based on the one or more seed lane segments and the one or more reachable lane segments (e.g., by determining a reachable target of a reachable lane segment in the candidate reference path as an end point of the candidate reference path).

In some embodiments, selecting the reference path from the one or more candidate reference paths for the agent includes: classifying the one or more candidate reference paths by predicting a discrete probability distribution over the one or more candidate reference paths based on at least one of path feature data associated with the one or more candidate reference paths or agent feature data associated with the one or more agents (e.g., as illustrated in diagram (b) of FIG. 7); and selecting the reference path for the agent from the one or more candidate reference paths based on the predicted discrete probability distribution (e.g., one with the highest probability).

In some embodiments, the process 900 further includes: extracting geometric information corresponding to each of the one or more candidate reference paths; and encoding the geometric information to the path feature data (e.g., by path feature encoding using a multi-layer perceptron (MLP) network). The geometric information includes at least one of a starting point, a middle point, an end point, a direction, or a length of the candidate reference path.

In some embodiments, the process 900 further includes: obtaining distance information from the location of the agent to at least one of a starting point, a middle point, or an end point of each of the one or more candidate reference paths; and encoding the distance information to distance feature data (e.g., using an MLP network). Predicting the discrete probability distribution over the one or more candidate reference paths includes: predicting the discrete probability distribution over the one or more candidate reference paths based on at least one of the path feature data, the agent feature data, or the distance feature data.

In some embodiments, the process 900 further includes: generating the agent feature data from a scene for each agent of the one or more agents, the agent feature data including information corresponding to at least one of a map associated with the environment of the vehicle, agent kinematics, agent-map interactions, or agent-agent interactions.

In some examples, generating the agent feature data includes: for each agent of the one or more agents, aggregating one or more neighboring agents' information and a local map structure of the map into corresponding feature data of the agent; and aggregating global interactions between agents into the agent's corresponding feature data.

In some examples, the agent kinematics comprises an agent behavior of each of the one or more agents, and the agent behavior includes at least one of a current location, a velocity, an acceleration, an angular velocity, or one or more past trajectories (e.g., based on sensor information of the vehicle and trajectory encoding).

In some examples, the information corresponding to the map includes at least one of lane segment information (e.g., position, length, geometry, connection, and/or direction) of a plurality of lane segments associated with the environment of the vehicle (e.g., obtained by Map encoding LaneGCN), or traffic information associated with the plurality of lane segments.

In some embodiments, the process 900 further includes: computing a path classification loss as a cross-entropy function based on the predicted discrete probability distribution and a ground-truth reference path for the agent; and re-classifying the one or more candidate reference paths based on a result of the computing the path classification loss.

In some embodiments, predicting the future trajectory of the agent based on the reference path includes: predicting the future trajectory of the agent based on at least one of the agent feature data, the path feature data, or agent history. The agent history includes one or more past trajectories of the agent.

In some embodiments, the process 900 further includes: transforming information corresponding to the reference path and the agent history (e.g., agent position and velocity derived from the agent history) from a Cartesian coordinate system to a path relative frame (e.g., Frenet Frame) that is based on the reference path; predicting the future trajectory of the agent in the path relative frame; and transforming the future trajectory of the agent from the path relative frame back to the Cartesian coordinate system.

In some examples, predicting the future trajectory of the agent in the path relative frame includes: performing a prediction of (or estimating) the future trajectory of the agent using a machine learning prediction model (e.g., a multi-layer perceptron (MLP) network). The process 900 further includes: training the machine learning prediction model by computing a loss function based on a path classification loss associated with a ground-truth reference path and a trajectory regression loss associated with a ground-truth trajectory conditioned on the ground-truth reference path.

In some embodiments, the process 900 further includes: determining a target for the future trajectory of the agent in the path relative frame based on an endpoint of the reference path. For example, the target can be the endpoint of the reference path or a point adjacent to the endpoint of the reference path, e.g., as illustrated in diagram (c) of FIG. 7. Predicting the future trajectory of the agent includes predicting the future trajectory of the agent based on the target and the reference path.

In some embodiments, the process 900 includes: periodically predicting a future trajectory of an agent in a current environment of the vehicle based on at least one reference path determined for the agent. For example, the perception system can perform the process 900 in a period, e.g., every 10 seconds, 20 seconds, 30 seconds, or 1 minute. In some embodiments, the perception system performs the process 900 continuously. For example, once a round of the process 900 ends, the process 900 restarts or reiterates. In some embodiments, the perception system performs the process 900 in response to a triggering event, e.g., an input from a driver.

Further non-limiting aspects or embodiments are set forth in the following numbered clauses:

Clause 1: A method, comprising: obtaining, by at least one processor, information about one or more agents in a portion of an environment where a vehicle is operating, the information comprising data associated with locations of the one or more agents in the portion of the environment; for at least one agent of the one or more agents, determining, by the at least one processor, a reference path for the agent based on a location of the agent in the environment, and predicting, by the at least one processor, a future trajectory of the at least one agent based on the reference path; and operating, using the at least one processor, the vehicle based on one or more predicted future trajectories of the at least one agent of the one or more agents.

Clause 2: The method of clause 1, wherein determining the reference path for the agent based on the location of the agent in the environment comprises: determining one or more candidate reference paths for the agent in the environment based on at least one of the location of the agent or a kinematic history of the agent; and selecting the reference path from the one or more candidate reference paths for the agent based on information of the one or more candidate reference paths.

Clause 3: The method of Clause 2, wherein determining the one or more candidate reference paths for the agent in the environment comprises: obtaining map information based on the location of the agent in the environment, the map information comprising data of a plurality of lane segments associated with the location of the agent in the environment and connection data of the plurality of lane segments; and determining the one or more candidate reference paths based the map information.

Clause 4: The method of clause 3, wherein each of the one or more candidate reference paths comprises a sequence of connected lane segments, and wherein determining the one or more candidate reference paths based on the map information comprises: selecting one or more seed lane segments as one or more starting points for the agent that are based on the location of the agent; searching, from the one or more seed lane segments, one or more reachable lane segments associated with a time period in future based on the connection data of the plurality of lane segments; and generating the one or more candidate reference paths based on the one or more seed lane segments and the one or more reachable lane segments.

Clause 5: The method of any one of clauses 2 to 4, wherein selecting the reference path from the one or more candidate reference paths for the agent comprises: classifying the one or more candidate reference paths by predicting a discrete probability distribution over the one or more candidate reference paths based on at least one of path feature data associated with the one or more candidate reference paths or agent feature data associated with the one or more agents; and selecting the reference path for the agent from the one or more candidate reference paths based on the predicted discrete probability distribution.

Clause 6: The method of clause 5, further comprising: extracting geometric information of each of the one or more candidate reference paths, wherein the geometric information comprises at least one of a starting point, a middle point, an end point, a direction, or a length of the candidate reference path; and encoding the geometric information to the path feature data, wherein predicting the discrete probability distribution over the one or more candidate reference paths comprises: predicting the discrete probability distribution over the one or more candidate reference paths based on the path feature data encoded with the geometric information.

Clause 7: The method of clause 5 or 6, further comprising: obtaining distance information from the location of the agent to at least one of a starting point, a middle point, or an end point of each of the one or more candidate reference paths; and encoding the distance information to distance feature data, wherein predicting the discrete probability distribution over the one or more candidate reference paths comprises: predicting the discrete probability distribution over the one or more candidate reference paths based on at least one of the path feature data, the agent feature data, or the distance feature data.

Clause 8: The method of any one of clauses 5 to 7, further comprising: generating the agent feature data from a scene for each agent of the one or more agents, the agent feature data comprising information corresponding to at least one of a map associated with the environment of the vehicle, agent kinematics, agent-map interactions, or agent-agent interactions.

Clause 9: The method of clause 8, wherein generating the agent feature data comprises: for each agent of the one or more agents, aggregating one or more neighboring agents' information and a local map structure of the map into corresponding feature data of the agent; and aggregating global interactions between agents into the agent's corresponding feature data.

Clause 10: The method of clause 8 or 9, wherein the agent kinematics comprises an agent behavior of each of the one or more agents, and wherein the agent behavior is associated with at least one of a current location, a velocity, an acceleration, an angular velocity, or one or more past trajectories of the agent.

Clause 11: The method of any one of clauses 8 to 10, wherein the information corresponding to the map comprises at least one of lane segment information of a plurality of lane segments associated with the environment of the vehicle, or traffic information associated with the plurality of lane segments.

Clause 12: The method of any one of clauses 5 to 11, further comprising: computing a path classification loss as a cross-entropy function based on the predicted discrete probability distribution and a ground-truth reference path for the agent; and re-classifying the one or more candidate reference paths based on a result of the computing the path classification loss.

Clause 13: The method of any one of clauses 5 to 12, wherein predicting the future trajectory of the at least one agent based on the reference path comprises: predicting the future trajectory of the at least one agent based on at least one of the agent feature data, the path feature data, or agent history.

Clause 14: The method of clause 13, further comprising: transforming information corresponding to the reference path and the agent history from a Cartesian coordinate system to a path relative frame that is based on the reference path; predicting the future trajectory of the agent in the path relative frame; and transforming the future trajectory of the agent from the path relative frame back to the Cartesian coordinate system.

Clause 15: The method of clause 14, wherein predicting the future trajectory of the agent in the path relative frame comprises: estimating the future trajectory of the agent using a machine learning prediction model.

Clause 16: The method of clause 15, further comprising: computing a loss function based on a path classification loss associated with a ground-truth reference path and a trajectory regression loss associated with a ground-truth trajectory conditioned on the ground-truth reference path; and training the machine learning prediction model based on the computed loss function.

Clause 17: The method of any one of clauses 14 to 16, further comprising: determining a target for the future trajectory of the agent in the path relative frame based on an endpoint of the reference path, wherein predicting the future trajectory of the agent comprises predicting the future trajectory of the agent based on the target and the reference path.

Clause 18: The method of any preceding clause, comprising: periodically predicting a future trajectory of an agent in a current environment of the vehicle based on at least one reference path determined for the agent.

Clause 19: A device, comprising: at least one processor, and at least one non-transitory storage media storing instructions that, when executed by the at least one processor, cause the at least one processor to perform the method according to any one of the preceding clauses.

Clause 20: At least one non-transitory storage media storing instructions that, when executed by at least one processor, cause the at least one processor to perform the method according to any one of the preceding clauses.

Clause 21: A vehicle, comprising: at least one sensor configured to acquire information about an environment of the vehicle; at least one processor communicatively coupled to the at least one sensor; and at least one non-transitory storage media storing instructions that, when executed by the at least one processor, cause the at least one processor to perform the method according to any one of the preceding clauses.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
  obtaining, by at least one processor, information about one or more agents in a portion of an environment where a vehicle is operating, the information comprising data associated with locations of the one or more agents in the portion of the environment;
  for at least one agent of the one or more agents,
    determining, by the at least one processor, a reference path for the agent based on a location of the agent in the environment,
    transforming, by the at least one processor, information corresponding to the reference path from a Cartesian coordinate system to a path relative frame that is based on the reference path,
    predicting, by the at least one processor, a future trajectory of the at least one agent in the path relative frame based on the reference path, and
    transforming, by the at least one processor, the future trajectory of the at least one agent from the path relative frame back to the Cartesian coordinate system; and
  controlling the vehicle to operate based on one or more predicted future trajectories of the at least one agent of the one or more agents.

2. The method of claim 1, wherein determining the reference path for the agent based on the location of the agent in the environment comprises:
  determining one or more candidate reference paths for the agent in the environment based on at least one of the location of the agent or a kinematic history of the agent; and
  selecting the reference path from the one or more candidate reference paths for the agent based on information of the one or more candidate reference paths.

3. The method of claim 2, wherein determining the one or more candidate reference paths for the agent in the environment comprises:
  obtaining map information based on the location of the agent in the environment, the map information comprising data of a plurality of lane segments associated with the location of the agent in the environment and connection data of the plurality of lane segments; and
  determining the one or more candidate reference paths based the map information.

4. The method of claim 3, wherein each of the one or more candidate reference paths comprises a sequence of connected lane segments, and
  wherein determining the one or more candidate reference paths based on the map information comprises:
    selecting one or more seed lane segments as one or more starting points for the agent that are based on the location of the agent;

searching, from the one or more seed lane segments, one or more reachable lane segments associated with a time period in future based on the connection data of the plurality of lane segments; and generating the one or more candidate reference paths based on the one or more seed lane segments and the one or more reachable lane segments.

5. The method of claim 2, wherein selecting the reference path from the one or more candidate reference paths for the agent comprises:

predicting a discrete probability distribution over the one or more candidate reference paths based on at least one of path feature data associated with the one or more candidate reference paths or agent feature data associated with the one or more agents;

classifying the one or more candidate reference paths based on the predicted discrete probability distribution; and selecting the reference path for the agent from the one or more candidate reference paths based on the predicted discrete probability distribution.

6. The method of claim 5, further comprising:

extracting geometric information of each of the one or more candidate reference paths, wherein the geometric information comprises at least one of a starting point, a middle point, an end point, a direction, or a length of the candidate reference path; and encoding the geometric information to the path feature data, wherein predicting the discrete probability distribution over the one or more candidate reference paths comprises:

predicting the discrete probability distribution over the one or more candidate reference paths based on the path feature data encoded with the geometric information.

7. The method of claim 5, further comprising:

obtaining distance information from the location of the agent to at least one of a starting point, a middle point, or an end point of each of the one or more candidate reference paths; and encoding the distance information to distance feature data, wherein predicting the discrete probability distribution over the one or more candidate reference paths comprises:

predicting the discrete probability distribution over the one or more candidate reference paths based on at least one of the path feature data, the agent feature data, or the distance feature data.

8. The method of claim 5, further comprising:

generating the agent feature data from a scene for each agent of the one or more agents, the agent feature data comprising information corresponding to at least one of a map associated with the environment of the vehicle, agent kinematics, agent-map interactions, or agent-agent interactions.

9. The method of claim 8, wherein generating the agent feature data comprises:

for each agent of the one or more agents, aggregating one or more neighboring agents' information and a local map structure of the map into corresponding feature data of the agent; and aggregating global interactions between agents into the agent's corresponding feature data.

10. The method of claim 8, wherein the agent kinematics comprises an agent behavior of each of the one or more agents, and wherein the agent behavior is associated with at least one of a current location, a velocity, an acceleration, an angular velocity, or one or more past trajectories of the agent.

11. The method of claim 8, wherein the information corresponding to the map comprises at least one of
lane segment information of a plurality of lane segments associated with the environment of the vehicle, or
traffic information associated with the plurality of lane segments.

12. The method of claim 5, further comprising:

computing a path classification loss as a cross-entropy function based on the predicted discrete probability distribution and a ground-truth reference path for the agent; and re-classifying the one or more candidate reference paths based on a result of the computing the path classification loss.

13. The method of claim 5, wherein predicting the future trajectory of the at least one agent based on the reference path comprises:

predicting the future trajectory of the at least one agent based on at least one of the agent feature data, the path feature data, or agent history.

14. The method of claim 1, wherein predicting the future trajectory of the agent in the path relative frame comprises:

estimating the future trajectory of the agent using a machine learning prediction model.

15. The method of claim 14, further comprising:

computing a loss function based on a path classification loss associated with a ground-truth reference path and a trajectory regression loss associated with a ground-truth trajectory conditioned on the ground-truth reference path; and training the machine learning prediction model based on the computed loss function.

16. The method of claim 1, further comprising:

determining a target for the future trajectory of the agent in the path relative frame based on an endpoint of the reference path, wherein predicting the future trajectory of the agent comprises predicting the future trajectory of the agent based on the target and the reference path.

17. The method of claim 1, comprising:

periodically predicting a future trajectory of an agent in a current environment of the vehicle based on at least one reference path determined for the agent.

18. At least one non-transitory storage medium storing instructions that, when executed by at least one processor, cause the at least one processor to perform operations comprising:

obtaining information about one or more agents in a portion of an environment where a vehicle is operating, the information comprising data associated with locations of the one or more agents in the portion of the environment;

for at least one agent of the one or more agents, determining a reference path for the agent based on a location of the agent in the environment, transforming information corresponding to the reference path from a Cartesian coordinate system to a path relative frame that is based on the reference path, predicting a future trajectory of the at least one agent in the path relative frame based on the reference path, and transforming the future trajectory of the at least one agent from the path relative frame back to the Cartesian coordinate system; and controlling the vehicle to operate based on one or more predicted future trajectories of the at least one agent of the one or more agents.

19. A vehicle, comprising:
 at least one sensor configured to acquire information about an environment of the vehicle;
 at least one processor communicatively coupled to the at least one sensor; and
 at least one non-transitory storage medium storing instructions that, when executed by the at least one processor, cause the at least one processor to perform operations comprising:
  obtaining information about one or more agents in a portion of the environment where the vehicle is operating, the information comprising data associated with locations of the one or more agents in the portion of the environment;
  for at least one agent of the one or more agents, determining a reference path for the agent based on a location of the agent in the environment, transforming information corresponding to the reference path from a Cartesian coordinate system to a path relative frame that is based on the reference path, predicting a future trajectory of the at least one agent in the path relative frame based on the reference path, and transforming the future trajectory of the at least one agent from the path relative frame back to the Cartesian coordinate system; and
  controlling the vehicle to operate based on one or more predicted future trajectories of the at least one agent of the one or more agents.

* * * * *